United States Patent
Jiang et al.

(10) Patent No.: US 11,064,527 B2
(45) Date of Patent: Jul. 13, 2021

(54) RANDOM ACCESS METHOD AND APPARATUS AND COMMUNICATION SYSTEM

(71) Applicant: FUJITSU LIMITED, Kawasaki (JP)

(72) Inventors: Qinyan Jiang, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/365,158

(22) Filed: Mar. 26, 2019

(65) Prior Publication Data

US 2019/0223227 A1  Jul. 18, 2019

Related U.S. Application Data

(63) Continuation of application No. PCT/CN2017/111757, filed on Nov. 17, 2017.

(51) Int. Cl.
*H04W 72/14* (2009.01)
*H04W 74/08* (2009.01)
(Continued)

(52) U.S. Cl.
CPC ......... *H04W 74/0833* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

2015/0085689 A1  3/2015 Vos
2019/0045549 A1* 2/2019 Wu ................ H04W 36/0055
(Continued)

FOREIGN PATENT DOCUMENTS

CN  101640922 A  2/2010
CN  101772182 A  7/2010
(Continued)

OTHER PUBLICATIONS

Written Opinion of the International Searching Authority issued for corresponding International Patent Application No. PCT/CN2017/111757 dated Aug. 8, 2018, with an English translation.
(Continued)

*Primary Examiner* — Brandon M Renner
(74) *Attorney, Agent, or Firm* — Myers Wolin, LLC

(57) ABSTRACT

A random access method and apparatus and a communication system are provided. The method includes: at a first time-frequency resource, a network device receives a first preamble transmitted by a first UE; according to the first preamble, the network device determines a first downlink bandwidth part (DL BWP) transmitting a second message (msg.2A); and the network device transmits msg.2A on the first DL BWP. With this method, according to a time-frequency resource and/or a preamble used by a random access request transmitted by the UE and/or indication information carried by the random access request, the base station may determine a DL BWP feeding back an RAR, thereby ensuring normal access of the UE.

20 Claims, 7 Drawing Sheets

(51) Int. Cl.
*H04W 48/16* (2009.01)
*H04W 72/04* (2009.01)
*H04L 5/00* (2006.01)

(52) U.S. Cl.
CPC .......... *H04L 5/0092* (2013.01); *H04W 48/16* (2013.01); *H04W 72/0453* (2013.01); *H04W 74/0841* (2013.01)

(56) References Cited

U.S. PATENT DOCUMENTS

| | | | |
|---|---|---|---|
| 2019/0104554 A1* | 4/2019 | Amuru | H04L 5/00 |
| 2019/0141742 A1* | 5/2019 | Zhou | H04W 72/048 |
| 2019/0150183 A1* | 5/2019 | Aiba | H04W 72/14 370/336 |
| 2019/0150200 A1* | 5/2019 | Chen | H04W 74/0833 |
| 2019/0182716 A1* | 6/2019 | Futaki | H04W 28/20 |
| 2019/0289513 A1* | 9/2019 | Jeon | H04W 72/0453 |
| 2019/0364602 A1* | 11/2019 | Yi | H04W 74/0833 |
| 2020/0213065 A1* | 7/2020 | Takeda | H04L 5/0082 |
| 2020/0221506 A1* | 7/2020 | Jeon | H04W 74/0808 |
| 2020/0252180 A1* | 8/2020 | Takeda | H04W 72/04 |
| 2020/0267753 A1* | 8/2020 | Adjakple | H04W 72/1226 |

FOREIGN PATENT DOCUMENTS

| | | |
|---|---|---|
| CN | 101778482 A | 7/2010 |
| CN | 101772182 B | 11/2012 |
| WO | 2017/031676 A1 | 3/2017 |

OTHER PUBLICATIONS

International Search Report issued by the State Intellectual Property Office of the P.R. China issued for corresponding International Patent Application No. PCT/CN2017/111757 dated Aug. 8, 2018, with an English translation.

Notice of Reasons for Refusal issued by the Japan Patent Office for corresponding Japanese Patent Application No. 2020-524744, dated May 25, 2021, with an English translation.

Samsung, "RACH procedure considering flexible UE bandwidth", Agenda Item: 7.1.2.5, 3GPP TSG-RAN WG1 Meeting #87, R1-1612469, Reno, USA, Nov. 14-18, 2016.

Panasonic, "Numerology for Msg2 and Msg4 for RRC_CONNECTED UEs", Agenda Item: 7.1.4.2, 3GPP TSG-RAN WG1 Meeting #90bis, R1-1718764, Prague,CZ, Oct. 9-13, 2017.

* cited by examiner

RANDOM ACCESS METHOD AND APPARATUS AND COMMUNICATION SYSTEM

CROSS REFERENCE TO RELATED APPLICATIONS

This application is a continuation application of International Application PCT/CN2017/111757 filed on Nov. 17, 2017, the entire contents of which are incorporated herein by reference.

FIELD

This disclosure relates to the field of communications, and in particular to a random access method and apparatus and a communication system.

BACKGROUND

A random access procedure includes non-contention-based random access and contention-based random access. In the non-contention-based random access procedure, a user equipment (UE) performs random access by using a random access preamble assigned by a network side (such as a base station) and a physical random access channel (PRACH). And in the contention-based random access procedure, a UE may select a preamble and a PRACH to perform random access.

In order to support rapidly-increased traffics and more and more new traffics, research institutes and standardization organizations in the world have successively started studies of the 5th generation (5G) wireless communication systems. During the studies, the 3rd Generation Partnership Project (3GPP) defines a plurality of application scenarios, such as massive machine type communication (MTC), enhanced mobile broadband (eMBB), and ultra-reliable and low-latency communication (URLLC), etc.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that a concept of bandwidth part (BWP) is introduced into a new radio (NR) system, and a DL (downlink)/UL (uplink) bandwidth may contain a plurality of BWPs. Each UE may be configured with one or more DL/UL BWPs, and receive/transmit uplink/downlink data using one of the configured DL/UL BWPs at the same time. Via radio resource control (RRC) signaling, a base station informs the UE of such information as an initial PRB index (or referred to as a value of offset from an initial PRB to a first PRB in a downlink bandwidth) of each DL/UL BWP, a subcarrier spacing, the number of physical resource blocks (PRBs) (or bandwidths), and a cyclic prefix (CP) length, etc. DL/UL BWP configurations of different UE may be different. In such a scenario, if the UE performs contention-based random access, the base station is unable to uniquely determine one UE according to a received message 1 (msg.1), hence, it is unable to determine a DL/UL BWP that should be used in transmitting a random access response (RAR), which will result in the random access not to be capable of being performed normally.

In order to solve at least one of the above problems, embodiments of this disclosure provide a random access method and apparatus and a communication system.

According to a first aspect of the embodiments of this disclosure, there is provided a random access method, including:

at a first time-frequency resource, receiving by a network device, a first preamble transmitted by a first UE;

according to the first preamble, determining by the network device, a first downlink bandwidth part (DL BWP) transmitting a second message (msg.2A); and transmitting msg.2A on the first DL BWP by the network device.

According to a second aspect of the embodiments of this disclosure, there is provided a random access method, including:

transmitting a first preamble by a UE at a first time-frequency resource;

determining a DL BWP receiving msg.2 by the UE according to the first preamble; and monitoring and receiving msg.2 by the UE on the DL BWP.

According to a third aspect of the embodiments of this disclosure, there is provided a random access apparatus, configured in a network device, the apparatus including:

a receiving unit configured to, at a first time-frequency resource, receive a first preamble transmitted by a first UE;

a determining unit configured to, according to the first preamble, determine a first downlink bandwidth part (DL BWP) transmitting a second message (msg.2A); and a transmitting unit configured to transmit msg.2A on the first DL BWP.

According to a fourth aspect of the embodiments of this disclosure, there is provided a random access apparatus, configured in a UE, the apparatus including:

a transmitting unit configured to transmit a first preamble at a first time-frequency resource;

a determining unit configured to determine a DL BWP receiving msg.2; and a receiving unit configured to monitor and receive msg.2 on the DL BWP.

According to a fifth aspect of the embodiments of this disclosure, there is provided a network device, including the apparatus as described in the third aspect.

According to a sixth aspect of the embodiments of this disclosure, there is provided a UE, including the apparatus as described in the fourth aspect.

According to a seventh aspect of the embodiments of this disclosure, there is provided a communication system, including the UE as described in the sixth aspect and the network device as described in the fifth aspect.

According to another aspect of the embodiments of this disclosure, there is provided a computer readable program, which, when executed in a network device, will cause a computer to carry out the method as described in the first aspect in the network device.

According to a further aspect of the embodiments of this disclosure, there is provided a computer storage medium, including a computer readable program, which will cause a computer to carry out the method as described in the first aspect in the network device.

According to still another aspect of the embodiments of this disclosure, there is provided a computer readable program, which, when executed in a UE, will cause a computer to carry out the method as described in the second aspect in the UE.

According to yet another aspect of the embodiments of this disclosure, there is provided a computer storage medium, including a computer readable program, which will cause a computer to carry out the method as described in the second aspect in the UE.

An advantage of the embodiments of this disclosure exists in that according to indication information carried by the preamble and/or the random access request (msg.1) transmitted by the UE, the base station may determine a DL BWP feeding back a random access response (msg.2), thereby ensuring normal access of the UE.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
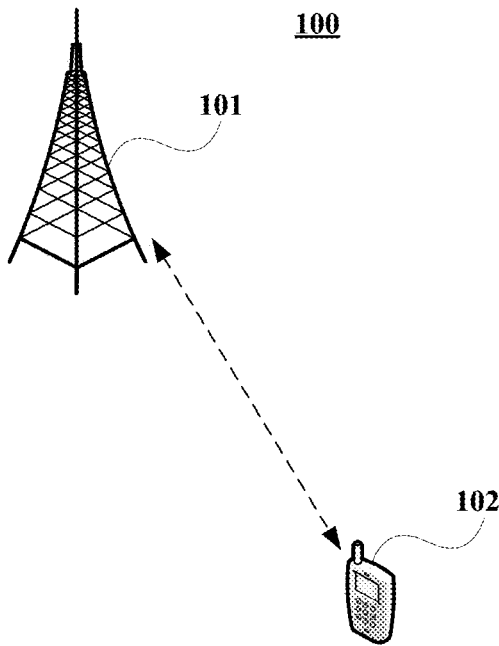
FIG. 1 is a schematic diagram of a communication system of an embodiment of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

The embodiments of this disclosure shall be described below with reference to the accompanying drawings.

FIG. 1 is a schematic diagram of a communication system of an embodiment of this disclosure, in which a case where a UE and a network device are taken as an example is schematically shown. As shown in FIG. 1, a communication system 100 may include a network device 101 and a UE 102. For the sake of simplicity, FIG. 1 shall be described by taking only one UE as an example. And the network device 101 is, for example, a network device gNB of NR.

In the embodiment of this disclosure, existing traffics or traffics that may be implemented in the future may be performed between the network device 101 and the UE 102. For example, such traffics include but not limited to enhanced mobile broadband (eMBB), massive machine type communication (MTC), and ultra-reliable and low-latency communication (URLLC), etc.

The UE 102 may transmit data to the network device 101, such as by using a grant-free transmission mode. The network device 101 may receive data transmitted by one or more UE(s) 102, and feed back information (such as acknowledgement (ACK)/non-acknowledgement (NACK) information) to the UE 102, and according to the feedback information, the UE 102 may determine to terminate a transmission process, or may perform new transmission of data, or may perform retransmission of data.

Figure 2:
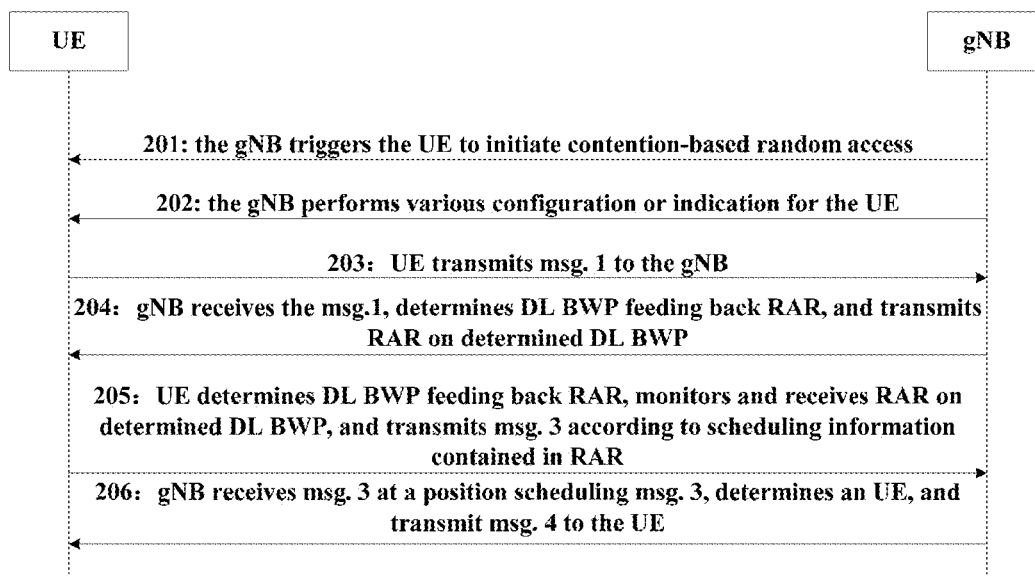
FIG. 2 is a schematic diagram of exchange of a random access method of an embodiment of this disclosure.

FIG. 2 is a schematic diagram of a random access procedure of the embodiment of this disclosure, in which a case where a UE and a gNB are taken as an example is schematically shown. As shown in FIG. 2, in step 201, the gNB may trigger the UE to initiate contention-based random access; however, step 201 is optional, and the UE may also autonomously initiate a contention-based random access procedure; in step 202, the gNB may perform various configurations, which may also be referred to as performing various indication, for the UE. An order of execution of step 201 and step 202 is not limited in the embodiment. In step 203, the UE transmit msg.1, i.e. a random access request, to the gNB, msg.1 may carry data information. In step 204, the gNB receives msg.1 on a configured time-frequency resource transmitting msg.1, determines a DL BPW feeding back an RAR according to msg.1, and transmits msg.2, i.e. a random access response (RAR), to the UE, the RAR containing scheduling information scheduling the UE to transmit msg.3. In step 205, the UE monitors and receives the RAR, and transmits msg.3 to the gNB according to the scheduling information contained in the received RAR, msg.3 containing an identification of the UE. In step 206, the gNB receives msg.3 at a position scheduling msg.3, uniquely determines a UE according the identification of the UE contained in msg.3, and transmits msg.4 to the determined UE.

Various implementations of the embodiments of this disclosure shall be described with reference to the accompanying drawings. These implementations are illustrative only, and are not intended to limit this disclosure.

Embodiment 1

Figure 3:
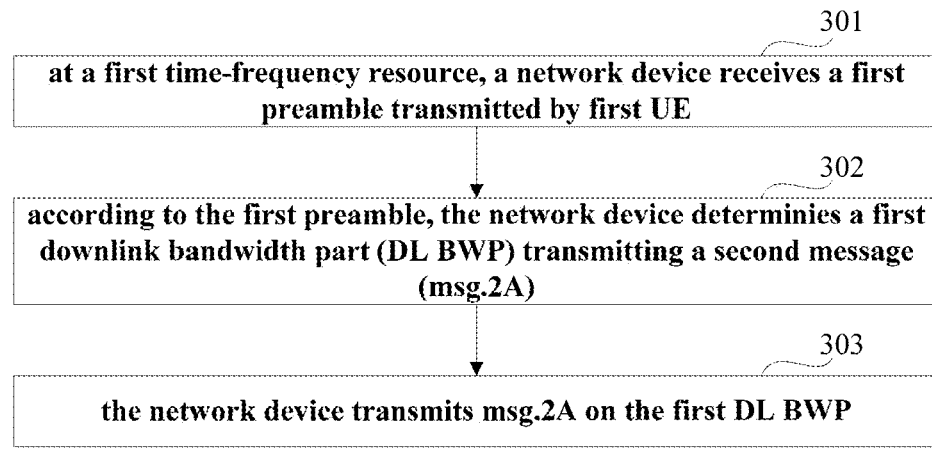
FIG. 3 is a schematic diagram of the random access method of Embodiment 1.

The embodiment provides a random access method, applicable to a network device, such as a gNB (a base station in NR). FIG. 3 is a flowchart of the method. Referring to FIG. 3, the method includes:

block 301: at a first time-frequency resource, a network device receives a first preamble transmitted by a first UE;

block 302: according to the first preamble, the network device determines a first downlink bandwidth part (DL BWP) transmitting a second message (msg.2A); and block 303: the network device transmits msg.2A on the first DL BWP.

In an embodiment, the UE transmits a preamble on a time-frequency resource, and the preamble is taken as a random access request, also referred to as msg.1. If the preamble is detected by the network device detects on a corresponding time-frequency resource, the network device learns that there exists a UE initiating random access, and it may feed back a random access response (RAR), also referred to as msg.2, to the UE.

In an embodiment, a time-frequency resource used in transmitting the preamble may be a PRACH resource. However, the embodiment is not limited thereto, and the time-frequency resource used in transmitting the preamble may be otherwise named, or may be another resource.

In an embodiment, the network device may determine a DL BWP (referred to as a first DL BWP) transmitting msg.2 (referred to as msg.2A) according to the time-frequency resource used by the received first preamble and/or the first preamble, so as to transmit msg.2. Hence, normal access of the UE is ensured.

In one implementation, the network device may indicate the first DL BWP and at least one preamble to which the first DL BWP corresponds. For example, the network device may configure a correspondence between the first preamble and at least one preamble so as to indicate the at least one preamble to which the first DL BWP corresponds, and the network device may determine the DL BWP transmitting msg.2 according to the indication and the received preamble (the first preamble). For example, when the received first preamble belongs to the indicated at least one preamble to which the first DL BWP corresponds, it may be determined that the DL BWP transmitting msg.2 is the first DL BWP.

In an implementation, the network device may further indicate a second DL BWP and at least one preamble corresponding to the second DL BWP, and after the network device receives a second preamble transmitted by a second UE, if the second preamble belongs to the at least one preamble corresponding to the second DL BWP, the network device determines that the DL BWP transmitting msg.2 is the second DL BWP, and transmits msg.2 on the second DL BWP.

In summary, in an implementation, the network device may determine the DL BWP transmitting msg.2 according to the received preamble and the above indication. For example, if the received preamble (such as the first preamble) belongs to the at least one preamble corresponding to the first DL BWP, the network device determines that the DL BWP transmitting msg.2 is the first DL BWP; and if the received preamble (such as the second preamble) belongs to the at least one preamble corresponding to the second DL BWP, the network device determines that the DL BWP transmitting msg.2 is the second DL BWP. Hence, the network device may determine the DL BWP transmitting msg.2 according to the received preamble.

In another implementation, the network device may indicate the first DL BWP and at least one time-frequency resource used for preamble transmission and corresponding to the first DL BWP. For example, the network device may configure a correspondence between the first DL BWP and at least one time-frequency resource for preamble transmission, so as to indicate the at least one time-frequency resource for preamble transmission corresponding to the first DL BWP, and according to the indication and the time-frequency resource (the above first time-frequency resource) transmitting the above preamble (the first preamble), the network device may determine the DL BWP transmitting msg.2. For example, when the first time-frequency resource belongs to the indicated at least one time-frequency resource for preamble transmission corresponding to the first DL BWP, it may be determined that the DL BWP transmitting msg.2 is the first DL BWP.

In an implementation, the network device may further indicate a second DL BWP and at least one time-frequency resource for preamble transmission corresponding to the second DL BWP, and after the network device receives a second preamble transmitted by the second UE, if the time-frequency resource (such as the second time-frequency resource) transmitting the second preamble belongs to the at least one time-frequency resource for preamble transmission corresponding to the second DL BWP, the network device determines that the DL BWP transmitting msg.2 is the second DL BWP, and transmits msg.2 on the second DL BWP.

In summary, in an implementation, the network device may determine the DL BWP transmitting msg.2 according to the time-frequency resource receiving the preamble and the above indication. For example, if the time-frequency resource receiving the preamble (such as the first time-frequency resource) belongs to the at least one time-frequency resource for preamble transmission corresponding to the first DL BWP, the network device determines that the DL BWP transmitting msg.2 is the first DL BWP; and if the time-frequency resource receiving the preamble (such as the second time-frequency resource) belongs to the at least one time-frequency resource for preamble transmission corresponding to the second DL BWP, the network device determines that the DL BWP transmitting msg.2 is the second DL BWP. Hence, the network device may determine the DL BWP transmitting msg.2 according to the time-frequency resource receiving the preamble.

In the above two implementations, the above first UE and second UE may be identical or different, that is, it is possible that the same UE uses identical or different time-frequency resources to transmit different preambles.

In the above two implementations, "at least one preamble corresponding to different DL BWPs" and "at least one time-frequency resource for preamble transmission corresponding to different DL BWPs" are described respectively. In particular implementation, the above two implementations may be combined; for example, the network device indicates "at least one preamble corresponding to different DL BWPs" and "at least one time-frequency resource for preamble transmission corresponding to different DL BWPs" at the same time. After receiving the preamble, the network device may determine the DL BWP transmitting msg.2 according to the preamble, the time-frequency resource transmitting the preamble and the above indication.

In an embodiment, the network device may configure a plurality of DL BWPs for transmitting msg.2, each DL BWP for transmitting msg.2 may correspond to a preamble set and/or a time-frequency resource set.

A correspondence between the DL BWPs and the time-frequency resource set shall be described below.

In one implementation of an embodiment, taking that the above time-frequency resources for preamble transmission are PRACH resources as an example, all PRACH resources that may be used for preamble transmission may be divided into more than one sets, PRACH resources in one set corresponding to one DL BWP that may be used for transmitting msg.2. Hence, after receiving the preamble, the network device may determine the DL BWP transmitting msg.2 according to the above indication and a PRACH resource used by the preamble.

For example, all the PRACH resources may be divided according to time-domain positions and/or frequency-domain positions of the PRACH resources. For example, PRACH resources of the same time-domain positions are divided into one set, or PRACH resources of the same frequency-domain positions are divided into one set, or PRACH resources of the same time-domain positions are divided into a plurality of sets, or PRACH resources of the same frequency-domain positions are divided into a plurality of sets. And a manner for dividing PRACH resource sets is not limited in the embodiment.

Figure 4:
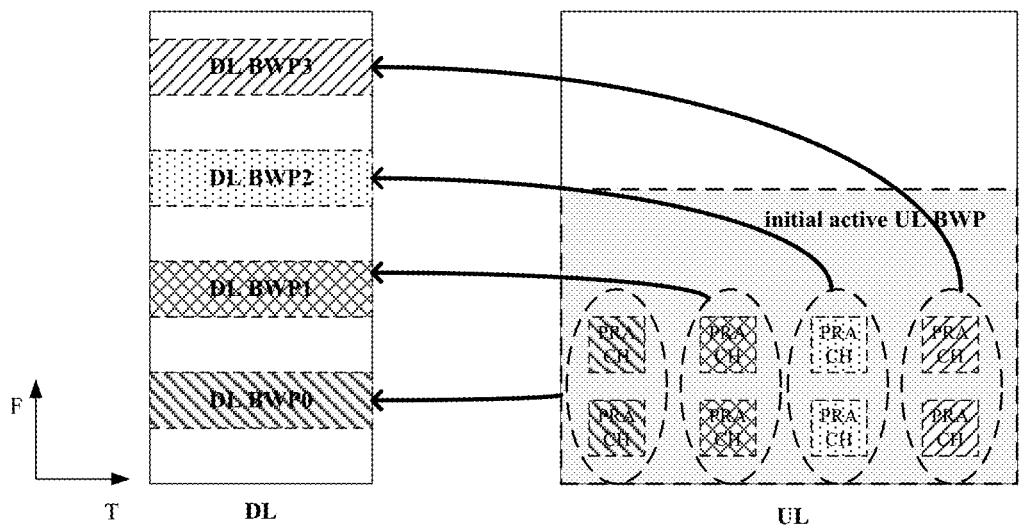
FIG. 4 is a schematic diagram of an implementation of dividing PRACH resources into sets.
Figure 5:
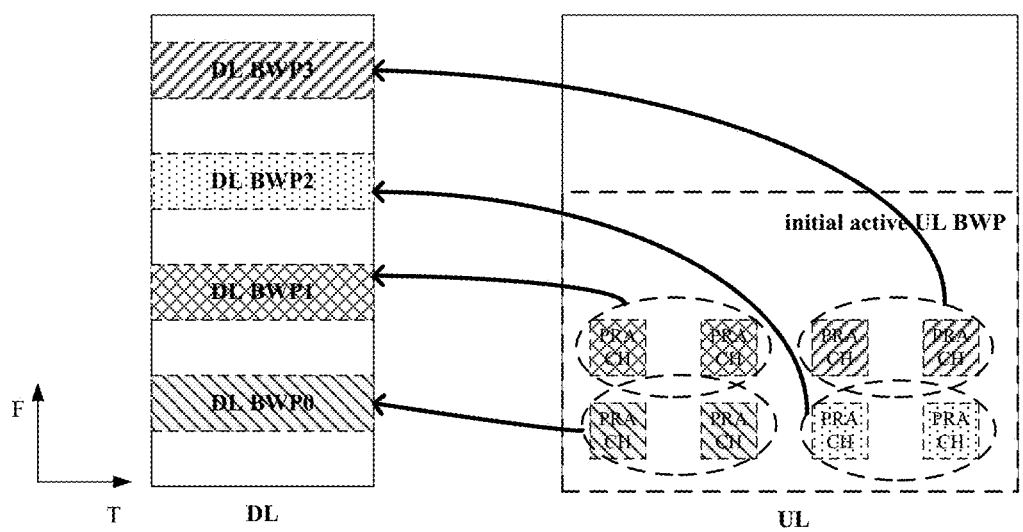
FIG. 5 is a schematic diagram of another implementation of dividing PRACH resources into sets.

FIGS. 4 and 5 respectively show division of PRACH resources and correspondences between different PRACH resource sets and DL BWPs transmitting RARs in a case where all PRACH resources are configured in one UL BWP, and in the examples in FIGS. 4 and 5, all the PRACH resources being configured in an initial active UL BWP used for initial access is taken as an example. As shown in FIG. 4, according to the time-domain positions of the PRACH resources, 8 PRACH resources are divided into 4 sets, corresponding respectively to DL BWP 0-DL BWP 3. As shown in FIG. 5, according to the time-domain positions and frequency-domain positions of the PRACH resources, 8 PRACH resources are divided into 4 sets, corresponding respectively to DL BWP 0-DL BWP 3.

Figure 6:
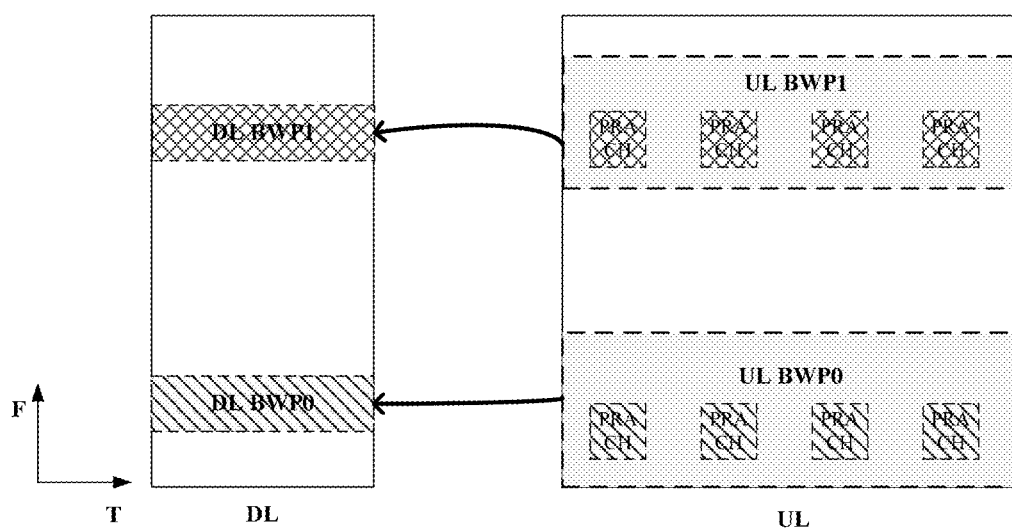
FIG. 6 is a schematic diagram of a further implementation of dividing PRACH resources into sets.
Figure 7:
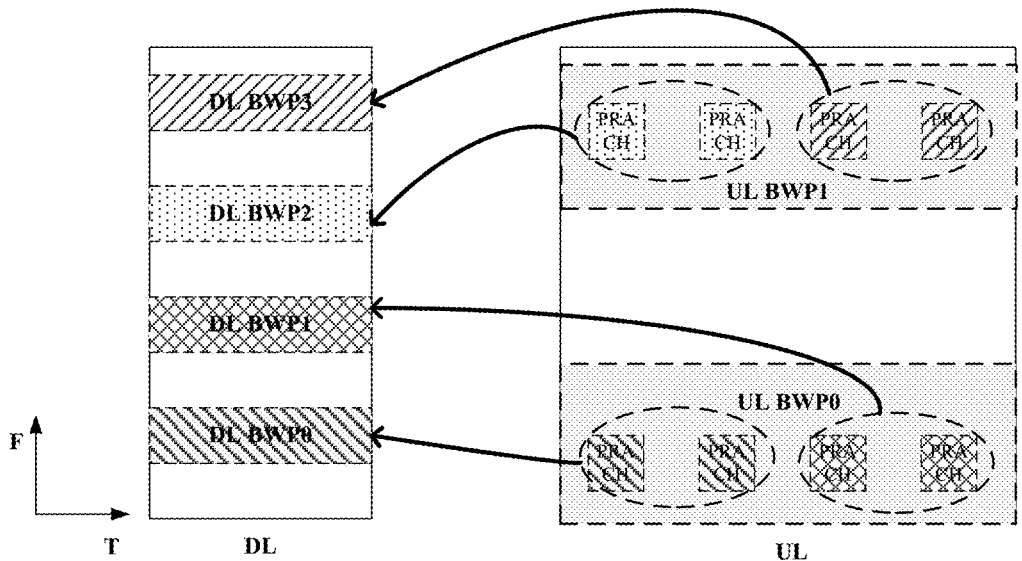
FIG. 7 is a schematic diagram of still another implementation of dividing PRACH resources into sets.

FIGS. 6 and 7 respectively show division of PRACH resources and correspondences between different PRACH resource sets and DL BWPs transmitting RARs in a case where all PRACH resources are configured in a plurality of UL BWPs, and in the examples in FIGS. 6 and 7, all the PRACH resources being configured in a UL BWP 0 and a UL BWP 1 is taken as an example. As shown in FIG. 6, according to the frequency-domain positions of the PRACH resources, 8 PRACH resources are divided into 2 sets, corresponding respectively to one DL BWP, and PRACH resources in one set being configured in one UL BWP. As shown in FIG. 7, according to the time-domain positions and frequency-domain positions of the PRACH resources, 8 PRACH resources are divided into 4 sets, corresponding respectively to one DL BWP, and PRACH resources in two sets being configured in one UL BWP, and PRACH resources in the other two sets being configured in the other UL BWP.

In an embodiment, in the case where all PRACH resources are configured in a plurality of UL BWPs, the at least one time-frequency resource that may be used for preamble transmission corresponding to different DL BWPs and indicated by the network device refers to a UL BWP containing PRACH resources, that is, the network device may indicate different UL BWPs containing PRACH resources and corresponding to different DL BWPs. Taking FIG. 6 as an example, the base station may indicate that UL BWP 0 corresponds to DL BWP 0 and UL BWP 1 corresponds to DL BWP 1. And taking FIG. 7 as an example, the base station may indicate that UL BWP 0 corresponds to DL BWP 0 and DL BWP 1, and UL BWP 1 corresponds to DL BWP 2 and DL BWP 3. Hence, the network device may determine the DL BWP transmitting msg.2 according to the indication and the UL BWP where the PRACH resource used by the received preamble is located. For example, if the PRACH resource used by the preamble received by the network device belongs to UL BWP 1 and according to the indication, UL BWP 1 corresponds to DL BWP 2, the network device may determine that the DL BWP transmitting msg.2 is DL BWP 2, and may transmit msg.2 on DL BWP 2.

The correspondence between DL BWPs and the preamble sets shall be described below.

In one implementation of an embodiment, in addition to dividing all the PRACH resources that may be used for preamble transmission into a plurality of sets to correspond respectively to different DL BWPs, all preambles may also be divided into a plurality of sets to correspond respectively to different DL BWPs. Hence, after receiving the preambles, the network device may further determine the DL BWP transmitting msg.2 with reference to the preamble transmitting msg.1.

Figure 8:
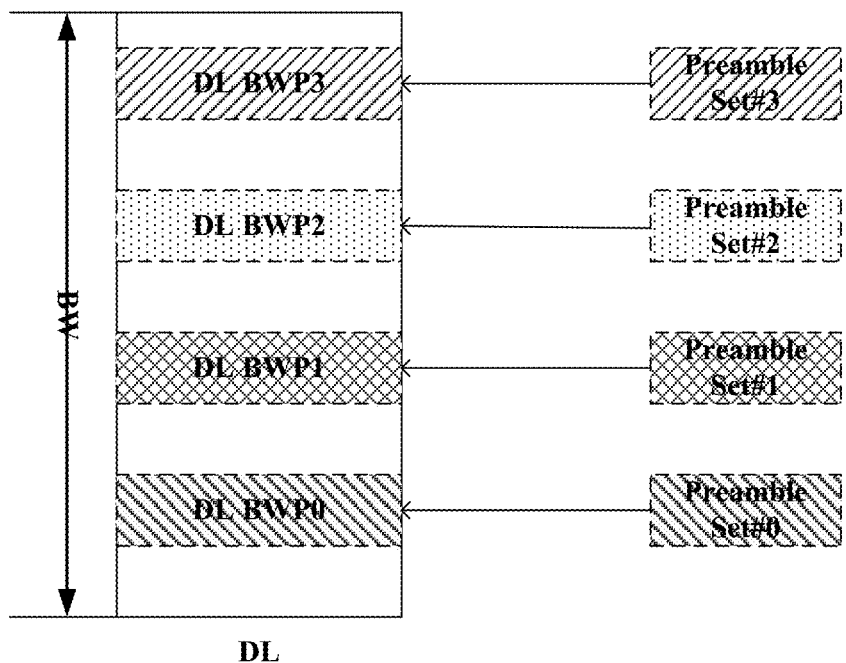
FIG. 8 is a schematic diagram of an implementation of dividing preambles into sets.

FIG. 8 shows division of preambles and a correspondence between different preamble sets and DL BWPs. As shown in FIG. 8, preamble set #0 corresponds to DL BWP 0, preamble set #1 corresponds to DL BWP 1, preamble set #2 corresponds to DL BWP 2, and preamble set #3 corresponds to DL BWP 3. A manner of division of preamble sets is not limited in the embodiment; for example, the division may be performed according to a root index, or the division may be performed according to cyclic shift, or the division may be performed according to an orthogonal cover code (OCC), etc.

The PRACH resources for preamble transmission, the correspondence between UL BWPs containing PRACH resources and DL BWPs and the correspondence between preambles and DL BWPs are respectively described above. In particular implementation, such two correspondences may be used in a combined manner. For example, all the PRACH resources that may be used for transmitting the preambles may be divided into a plurality of sets, PRACH resources in different sets corresponding to different DL BWPs, and at the same time, all the preambles are divided into a plurality of sets, preambles in different sets corresponding to different DL BWPs. For another example, UL BWPs containing the PRACH resources that may be used for preamble transmission correspond to different DL BWPs, and at the same time, all the preambles are divided into a plurality of sets, preambles in different sets corresponding to different DL BWPs.

The correspondence between DL BWPs and the preamble sets and the correspondence between DL BWPs and the PRACH resource sets shall be described below.

Figure 9:
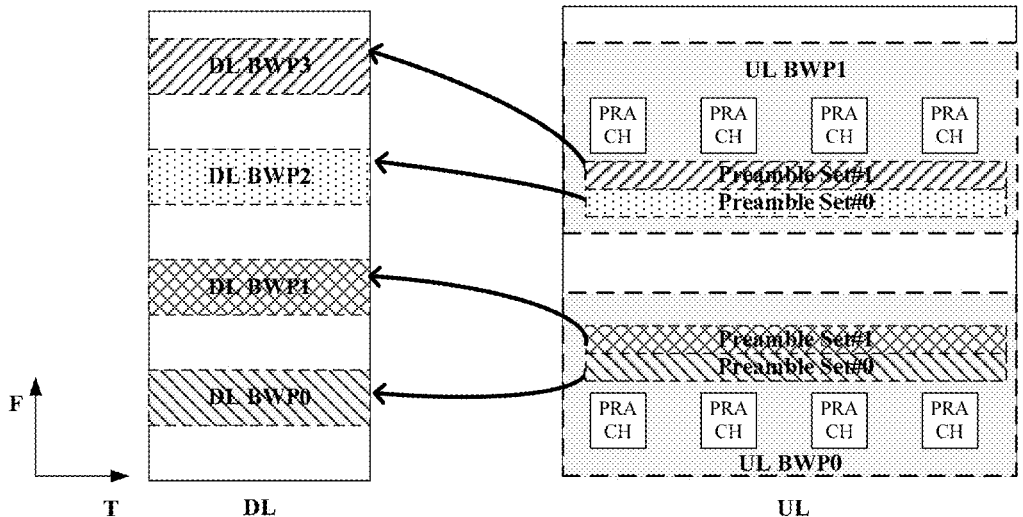
FIG. 9 is a schematic diagram of an implementation of dividing PRACH resources and preambles into sets.

FIG. 9 shows division of PRACH resources, division of preambles, correspondence between different preamble sets and DL BWPs and correspondence between different PRACH resource sets and DL BWPs, in the case where all PRACH resources are configured in a plurality of UL BWPs, and in the examples in FIG. 9, all PRACH resources being configured in UL BWP 0 and UL BWP 1 is taken as an example. As shown in FIG. 9, in UL BWP 0, preambles are divided into two sets, preamble set #0 and preamble set #1, corresponding respectively to DL BWP 0 and DL BWP 1, and in UL BWP 1, preambles are also divided into two sets, preamble set #0 and preamble set #1, corresponding respectively to DL BWP 2 and DL BWP 3; and all the PRACH resources are divided into two sets, PRACH resource set configured in UL BWP 0 corresponding to DL BWP 0 and DL BWP 1, and PRACH resource set configured in UL BWP 1 corresponding to DL BWP 2 and DL BWP 3. Hence, after receiving the preamble, the network device may determine two DL BWPs, DL BWP 0 and DL BWP 1, or DL BWP 2 and DL BWP 3, according to the PRACH resources transmitting the preamble, and finally determine the DL BWP transmitting msg.2 according to whether the received preamble belongs to preamble set #0 or preamble set #1.

In an embodiment, the network device may perform the above indication via broadcast information (PBCH), or system information and/or RRC signaling (such as group-specific RRC and/or UE-specific RRC); however, it is not limited thereto.

If DL BWPs that may be used for transmitting msg.2 are indicated in PBCHs, the network device may transmit one or more synchronization signal PBCH blocks (SSBs) that are at different frequency-domain positions, indicate respectively DL BWPs used for transmitting msg.2 in PBCHs of each SSB, and indicate a time-frequency resource and/or a preamble that may be used for transmitting msg.1 and corresponding to the DL BWPs in a system message.

If DL BWPs that may be used for transmitting msg.2 are indicated in system information and/or RRC signaling, time-frequency resources and/or preambles that may be used for transmitting msg.1 and the DL BWPs that may be used for transmitting msg.2 may be indicated in one RRC IE of the same message (such as system information/group-specific RRC/UE-specific RRC). For example, one message contains one or more RRC IEs (common or dedicated, such as a bandwidth part) indicating the DL BWPs used for transmitting msg.2, each IE indicating the DL BWPs used for transmitting msg.2 containing a corresponding time-frequency resource and/or preamble (such as RACH-ConfigCommon, RACH-ConfigDedicated). For another example, one message contains one or more RRC IEs (such as RACH-ConfigCommon, RACH-ConfigDedicated) indicating the time-frequency resources and/or preambles that may be used for transmitting msg.1, each IE indicating the time-frequency resources and/or preambles that may be used for transmitting msg.1 containing a corresponding DL BWPs used for transmitting msg.2 (such as a bandwidth part). And furthermore, the time-frequency resources and/or preambles that may be used for transmitting msg.1 and the DL BWPs that may be used for transmitting msg.2 may also be indicated in different IEs of the same message. For example, one message contains one or more RRC IEs (such as CSI-MeasConfig) indicating an SSB or CSI-RS configuration, each IE indicating the CSI-RS configuration containing corresponding time-frequency resources and/or preambles (such as RACH-ConfigCommon, RACH-ConfigDedicated) and corresponding DL BWPs used for transmitting msg.2.

And the network device may indicate a plurality of DL BWPs that may be used for transmitting msg.2 in the system message and a time-frequency resource and/or preamble used for transmitting msg.1 to which each DL BWP corresponds, and may further indicate the UE one or more of the DL BWPs that may be used for transmitting msg.2 via the RRC signaling.

In an embodiment, the network device may further indicate a DL BWP index, such as containing index information in an RRC IE indicating the DL BWPs used for transmitting msg.2.

In an embodiment, the random access method is applicable to contention-based random access, and the random access may be initiated by the UE autonomously, or may be initiated by the UE after being triggered by the network device.

In the case where the random access is triggered by the network device, the network device may, via DCI or RRC signaling, trigger the UE to initiate the contention-based random access.

In one implementation, in the case where the network device triggers the UE to initiate the random access, the network device may further indicate the UE of a DL BWP for transmitting msg.2 (such as a DL BWP index). Hence, the UE may determine a DL BWP receiving msg.2, and monitor and receive msg.2 on the DL BWP.

In an implementation, as described above, the network device may further indicate the first DL BWP and at least one preamble corresponding to the first DL BWP, and when the received first preamble belongs to the indicated at least one preamble corresponding to the first DL BWP, determine that the DL BWP used for transmitting msg.2 is the first DL BWP.

In an implementation, as described above, the network device may further indicate the first DL BWP and at least one time-frequency resource for preamble transmission corresponding to the first DL BWP, and when the first time-frequency resource receiving the first preamble belongs to the indicated at least one time-frequency resource for preamble transmission corresponding to the first DL BWP, determine that the DL BWP used for transmitting msg.2 is the first DL BWP.

In another implementation, in the case where the network device triggers the UE to initiate the random access, the network device may not designate a set of preambles and/or a set of time-frequency resources that may be used by the UE in transmitting msg.1, and may designate a set of preambles and/or a set of time-frequency resources that may be used by the UE in transmitting msg.1. The time-frequency resources here refer to PRACH resources or UL BWPs containing PRACH resources; however, it is not limited thereto. In the case of not designating, the UE may, according to a policy of itself, select preambles and resources for transmitting msg.1; and in the case of designating, the UE may select preambles and resources from a designated set of preambles and/or a designated set of resources, which shall be described in detail in Embodiment 2.

In the case where the network device designates a set of preambles and/or a set of resources that may be used by the UE in transmitting msg.1, the network device may, according to the above-described indication and the time-frequency resources (PRACH resources or UL BWPs containing PRACH resources) and/or the preambles used for transmitting msg.1 corresponding to the DL BWPs used for transmitting msg.2, designate a set of preambles and/or a set of resources that may be used by the UE.

For example, the network device may designate the UE to use one or more preambles and/or resources to which the DL BWPs used for transmitting msg.2 correspond. For another example, the network device may inform the UE of one or more DL BWPs that may be used for transmitting msg.2, and the UE selects preambles and/or resources according to the information.

In an embodiment, the network device may receive the above preambles on the configured time-frequency resources, and transmit msg.2 on the determined DL BWPs. The msg.2 may contain scheduling information scheduling the UE to transmit a third message (msg.3). Hence, after receiving msg.2, the UE may transmit msg.3 to the network device according to the scheduling information contained in msg.2 (step 205), as shown in FIG. 2. The msg.3 may contain an identification of the UE (UE_ID), such as a C-RNTI, etc. And the network device may receive msg.3 at a position of the above scheduling, uniquely determine the UE initiating the random access according to the identification of the UE contained in msg.3, and transmit msg.4 to the UE (step 206), thereby ensuring normal access of the UE.

In an embodiment, the network device may transmit msg.4 via the DL BWP transmitting msg.2, or may transmit msg.4 via an active DL BWP before the UE initiates the contention-based random access, or may transmit msg.4 via a default DL BWP configured for the UE in a case where the UE is configured with the default DL BWP, or may transmit msg.4 via an active DL BWP in a case where the active DL BWP before the UE initiates the contention-based random access does not expire, or may transmit msg.4 via a default DL BWP configured for the UE in a case where an active DL BWP before the UE initiates the contention-based random access expires.

When one or more of the DL BWPs configured for the UE is(are) activated, if the UE is configured with a default DL BWP, the UE starts a timer for each of the activated DL BWPs. And when the UE receives control information, the UE resets a value of a timer to which a DL BWP transmitting the control information corresponds. When the value of the timer is 0, that is, when the timer expires, the UE switches to the default DL BWP.

In the above embodiments, description is given to determining the DL BWPs transmitting msg.2 according to the received preambles and/or the time-frequency resources transmitting the preambles. And in the above embodiments, in determining the DL BWPs transmitting msg.2, the above correspondences indicated by the network device are used.

In other embodiments, the correspondences may not be used, and the DL BWPs transmitting msg.2 are determined according to msg.1 transmitted by the UE.

In an embodiment, the network device receives msg.1 transmitted by the UE. The msg.1 contains indication information indicating the DL BWPs transmitting msg.2. The indication information may be, for example, a DL BWP index, or an identification of a UE (C-RNTI). And the network device determines the DL BWPs transmitting msg.2 according to the indication information, and transmits msg.2 on the determined DL BWPs.

In an embodiment, msg.1 is not limited to being used for random access, for example, msg.1 may include indication information and signals. The signals may be located at one or more symbols, may be used in uplink timing/channel estimation/channel quality measurement, and may be predefined signals, such as sequence signals, which may also be referred to as preambles, pilots, and reference signals, etc.

In an embodiment, msg.1 may carry the indication information indicating the DL BWPs transmitting msg.2, the indication information may be bit information, and in a case where the network device configures or indicates the DL BWPs that may be used for transmitting msg.2, the UE may inform the network device of the DL BWPs transmitting msg.2 via the indication information carried by msg.1 (such as a DL BWP index, or an identification of the UE (UE_ID), such as C-RNTI). Hence, after receiving msg.1, the network device needs not to consider time-frequency resources transmitting the preambles or the preambles, nor needs to consider the above correspondences, and may determine the DL BWPs transmitting msg.2 directly according to the indication information carried by msg.1. Of course, the embodiment is not limited thereto, and alternatively, the network device may consider time-frequency resources transmitting the preambles or the preambles and the above correspondences, and determine the DL BWPs transmitting msg.2 after comprehensive consideration.

For example, the network device may indicate preambles corresponding to DL BWPs, and determine the DL BWPs transmitting msg.2 according to the above-described indication information, preambles used by the received msg.1 and the indicated preambles corresponding to the DL BWPs.

For another example, the network device may indicate time-frequency resources used for transmitting msg.1 and corresponding to DL BWPs, and determine the DL BWPs transmitting msg.2 according to the above-described indication information, time-frequency resources receiving msg.1 and the indicated time-frequency resources used for transmitting msg.1 and corresponding to DL BWPs.

For further example, the network device may indicate preambles corresponding to DL BWPs and time-frequency resources used for transmitting msg.1 and corresponding to DL BWPs, and determine the DL BWPs transmitting msg.2 according to the above-described indication information, preambles used by the received msg.1, time-frequency resources receiving msg.1, the indicated preambles corresponding to the DL BWPs, and the indicated time-frequency resources used for transmitting msg.1 and corresponding to DL BWPs.

With the method of the embodiment, the network device may determine the DL BWPs transmitting msg.2 according to time-frequency resources and/or the preambles used by the received msg.1 and/or the indication information carried by msg.1, so as to transmit msg.2, thereby ensuring normal access of the UE.

Embodiment 2

Figure 10:
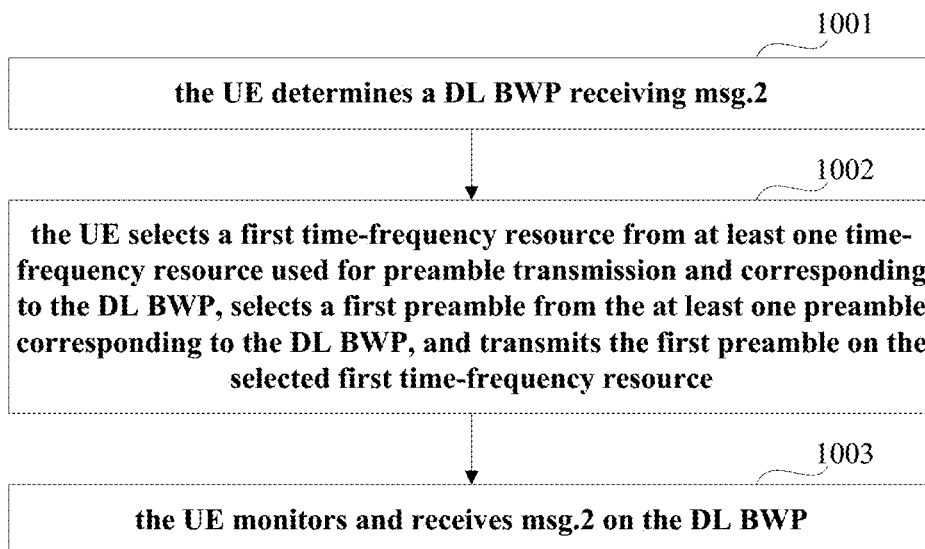
FIG. 10 is a schematic diagram of the random access method of Embodiment 2.

The embodiment provides a random access method, applicable to a UE, which is processing at a terminal side corresponding to the method of Embodiment 1, with contents identical to those in Embodiment 1 being not going to be described herein any further. FIG. 10 is a schematic diagram of the method. Referring to FIG. 10, the method includes:

block 1001: the UE determines a DL BWP receiving msg.2;

block 1002: the UE selects a first time-frequency resource from at least one time-frequency resource used for preamble transmission and corresponding to the DL BWP, selects a first preamble from at least one preamble corresponding to the DL BWP, and transmits the first preamble on the selected first time-frequency resource; and block 1003: the UE monitors and receives msg.2 on the DL BWP.

In an embodiment, as described in Embodiment 1, the above time-frequency resource may be a PRACH resource, the above first preamble may be msg.1 (a random access request), the above msg.2 may be a random access response, and the UE may autonomously initiate the random access, or may initiate the random access according to triggering of a network device.

In one implementation of block 1001, as described in Embodiment 1, the network device may indicate a first DL BWP and at least one time-frequency resource used for preamble transmission and corresponding to the first DL BWP, and/or a second DL BWP and at least one time-frequency resource used for preamble transmission and corresponding to the second DL BWP. The UE may receive the indication, and determine the DL BWP receiving msg.2 according to the indication.

In another implementation of block 1001, as described in Embodiment 1, the network device may indicate a first DL BWP and at least one preamble corresponding to the first DL BWP, and/or a second DL BWP and at least one preamble corresponding to the second DL BWP. The UE may receive the indication, and determine the DL BWP receiving msg.2 according to the indication.

In an embodiment, the above two implementations may be combined.

In a further implementation of block 1001, as described in Embodiment 1, in triggering the UE to perform contention-based random access, the network device may indicate the UE of the DL BWP transmitting msg.2. Hence, the UE may determine the DL BWP receiving msg.2 according to the indication.

A particular indication manner and a correspondence between DL BWPs that may be used for transmitting msg.2 and preambles and/or a correspondence between DL BWPs that may be used for transmitting msg.2 and time-frequency resources that may be used for preamble transmission have been described in detail in Embodiment 1, the contents of which being incorporated herein, and being not going to be described herein any further.

In block 1002, in a case where the network device does not designate a set of preambles and/or a set of time-frequency resources corresponding to a DL BWP and used in preamble transmission, that is, the UE autonomously initiates the random access or the network device triggers the UE to initiate the random access without the above designation, in a case where the UE may only activate and use one UL BWP, the UE may transmit the first preamble in following manners.

For example, in a case where a current active UL BWP contains the time-frequency resources used for preamble transmission, the UE selects a time-frequency resource used for transmitting the first preamble from the current active UL BWP to transmit the first preamble.

For another example, the UE may switch to another UL BWP containing PRACH resources and use a PRACH resource therein to transmit the first preamble.

For example, the UE may switch to other allocated UL BWPs that are not activated and containing PRACH resources used for preamble transmission and select therefrom a PRACH resource used for transmitting the first preamble to transmit the first preamble.

For another example, the UE may switch to other UL BWPs containing PRACH resources used for preamble transmission than all allocated UL BWPs and select therefrom a PRACH resource used for transmitting the first preamble to transmit the first preamble.

Furthermore, in a case where the UE may activate and use two or more UL BWPs, the UE may transmit the first preamble in following manners.

For example, in a case where the number of activated UL BWPs does not reach a maximum value, the UE may activate other allocated unactivated UL BWPs containing PRACH resources used for preamble transmission and select therefrom a PRACH resource used for transmitting the first preamble to transmit the first preamble.

For another example, the UE may activate or switch to another UL BWP containing PRACH resources and use a PRACH resource therein to transmit the first preamble.

For example, in a case where the number of activated UL BWPs does not reach a maximum value, the UE may activate other UL BWPs containing PRACH resources used for preamble transmission than all allocated UL BWPs and select therefrom a PRACH resource used for transmitting the first preamble to transmit the first preamble.

For another example, the UE may switch at least one activated UL BWP to other allocated unactivated UL BWPs containing PRACH resources used for preamble transmission and select therefrom a PRACH resource used for transmitting the first preamble to transmit the first preamble.

For another example, the UE may switch at least one activated UL BWP to other UL BWPs containing PRACH resources used for preamble transmission than all allocated UL BWPs and select therefrom a PRACH resource used for transmitting the first preamble to transmit the first preamble.

In block 1002, in a case where the gNB designates a set of preambles and/or a set of time-frequency resources corresponding to a DL BWP and used in preamble transmission, that is, the network device triggers the UE to initiate the random access and performs the above designation, the UE may select a time-frequency resource used for transmitting the first preamble from the set of time-frequency resources and/or the set of preambles used for preamble transmission and designated by the network device to transmit the first preamble. And furthermore, with such designation, a DL BWP used by the network device for transmitting msg. 2 may be impliedly indicated to the UE, hence, the UE may determine the DL BWP receiving msg.2 according to the indication.

In another implementation of block 1003, as described in Embodiment 1, the network device may further indicate at least one preamble corresponding to the first DL BWP and/or at least one preamble corresponding to the second DL BWP. The UE may receive the indication, and according to the indication and time-frequency resources used for transmitting the first preamble, determine the DL BWP used by the network device for transmitting msg.2.

For example, in a case where the first preamble transmitted by the UE corresponds to the first DL BWP, that is, the first preamble belongs to the at least one preamble to which the first DL BWP corresponds, the UE determines that the DL BWP used by the network device for transmitting msg.2 is the first DL BWP. For another example, in a case where the first preamble transmitted by the UE corresponds to the second DL BWP, that is, the first preamble belongs to the at least one preamble to which the second DL BWP corresponds, the UE determines that the DL BWP used by the network device for transmitting msg.2 is the second DL BWP.

A particular indication manner and a correspondence between DL BWPs that may be used for transmitting msg.2 and preambles have been described in detail in Embodiment 1, the contents of which being incorporated herein, and being not going to be described herein any further.

In block 1003, in a case where the UE may receive and use only one DL BWP at the same time, the UE may monitor and receive msg.2 in following manners.

For example, if CORESET configuration used for transmitting msg.2 on the determined DL BWP is identical to CORESET configuration used for transmitting msg.2 on current active DL BWPs, the UE may monitor and receive msg.2 on the current active DL BWPs.

For another example, the UE may also switch to the determined DL BWP, and monitor and receive msg.2 on the determined DL BWPs.

In block 1003, in a case where the UE may receive and use two or more DL BWPs at the same time, the UE may monitor and receive msg.2 in following manners.

For example, if CORESET configuration used for transmitting msg.2 on the determined DL BWPs is identical to CORESET configuration used for transmitting msg.2 on current active DL BWPs, the UE may monitor and receive msg.2 on the current active DL BWPs.

For another example, the UE may active or switch to another DL BWP, and monitor and receive msg.2.

For example, if the activated DL BWPs do not reach a maximum number, the UE may activate the determined DL BWPs, and monitor and receive msg.2 on the determined DL BWPs.

For another example, the UE may switch one of the activated DL BWPs to the determined DL BWPs, and monitor and receive msg.2 on the determined DL BWPs.

In the above description, the above determined DL BWPs are DL BWPs to which msg.1 transmitted by the UE corresponds, that is, DL BWPs transmitting msg.2 to which the time-frequency resource transmitting the first preamble and/or the first preamble correspond(s).

In an embodiment, after receiving msg.2, the UE may transmit msg.3 according to the scheduling information for transmitting msg.3 contained in msg.2, an identification of the UE may be contained in msg.3, i.e. UE_ID. As described above, the network device may receive msg.3 at the scheduled position, uniquely determine a UE according to the UE_ID contained in msg.3, and transmit msg.4 to the UE. A particular transmission manner is as described in Embodiment 1, and shall not be described herein any further.

In an embodiment, the UE may receive msg.4, thereby completing the whole procedure of random access.

In an embodiment, corresponding to other embodiments of the network device side, msg.1 may also indicate the DL BWPs transmitting msg.2 by carrying indication information, hence, in an embodiment, the UE may determine the DL BWPs used by the network device for transmitting msg.2 according to the indication information carried by msg.1 transmitted by it, so as to monitor and receive msg.2 on the determined DL BWPs.

In an embodiment, the UE may transmit msg.1 to the network device, msg.1 containing indication information indicating the network device of the DL BWPs transmitting msg.2, the indication information being bit information, determine the DL BWPs receiving msg.2 according to the indication information, and receive msg.2 transmitted by the network device on the determined DL BWPs.

In an embodiment, the UE may determine the DL BWPs receiving msg.2 according to, in addition to the indication information, the time-frequency resource transmitting msg.1 and/or the preamble used by msg.1.

For example, the UE may determine the DL BWPs receiving msg.2 according to the indication information, the preambles corresponding to the DL BWPs and indicated by the network device and the preamble used by msg.1.

For another example, the UE may determine the DL BWPs receiving msg.2 according to the indication information, the time-frequency resource transmitting msg.1 and the time-frequency resources used for transmitting msg.1 corresponding to the DL BWPs and indicated by the network device.

With the method of the embodiment, the UE may transmit msg.1 to the network device, determine the DL BWPs used by the network device for transmitting msg.2 according to transmitted msg.1 (such as the time-frequency resource and/or preamble transmitting msg.1 and/or the indication information carried by msg.1), and monitor and receive msg.2 on the DL BWPs, thereby completing the whole procedure of random access. Hence, normal access of the UE is ensured.

Embodiment 3

The embodiment provides a random access apparatus, configured in a network device, such as a gNB (a base station in NR). As principles of the apparatus for solving problems are similar to that of the method in Embodiment 1, the implementation of the method in Embodiment 1 may be referred to for implementation of the apparatus, with identical contents being not going to be described herein any further.

Figure 11:
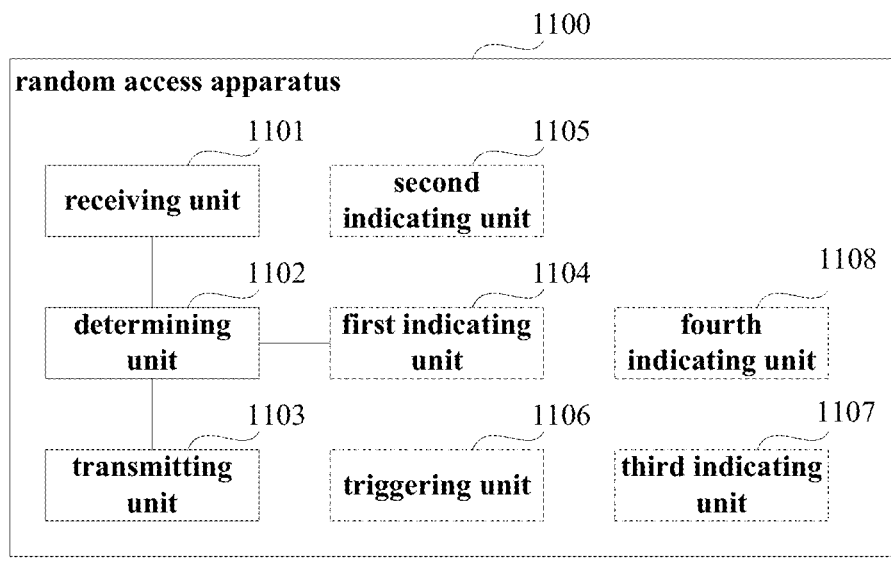
FIG. 11 is a schematic diagram of the random access apparatus of Embodiment 3.

FIG. 11 is a schematic diagram of the apparatus. As shown in FIG. 11, a random access apparatus 1100 includes a receiving unit 1101, a determining unit 1102 and a transmitting unit 1103. The receiving unit 1101 receives a first preamble transmitted by a first UE at a first time-frequency resource; the determining unit 1102 determines a downlink bandwidth part (DL BWP) transmitting a second message (msg.2A) according to the first preamble; and the transmitting unit 1103 transmits msg.2A on the DL BWP.

In an embodiment, the determining unit 1102 may determine the DL BWP used for transmitting msg.2 according to the received first preamble, thereby ensuring normal access of the UE.

In one implementation of an embodiment, as shown in FIG. 11, the random access apparatus 1100 further includes a first indicating unit 1104 configured to indicate the first DL BWP and at least one preamble to which the first DL BWP corresponds, the first preamble belonging to the at least one preamble to which the first DL BWP corresponds indicated by the first indicating unit 1104. Hence, the determining unit 1102 may determine the first DL BWP according to the indication of the first indicating unit 1104 and the first preamble.

In an implementation, the first indicating unit 1104 may further indicate a second DL BWP and at least one preamble corresponding to the second DL BWP; and the receiving unit 1101 may further receive a second preamble transmitted by a second UE, the second preamble belonging to the at least one preamble corresponding to the second DL BWP indicated by the first indicating unit 1104; the determining unit 1102 may further determine a second DL BWP transmitting a second message (msg.2B) according to the indication of the first indicating unit 1104 and the second preamble; and the transmitting unit 1103 may further transmit msg.2B on the second DL BWP.

In an embodiment, the first indicating unit 1104 may perform the above indication via broadcast information, or system information and/or RRC signaling.

In another implementation of an embodiment, as shown in FIG. 11, the random access apparatus 1100 further includes a second indicating unit 1105 configured to indicate the first DL BWP and at least one time-frequency resource used for preamble transmission and corresponding to the first DL BWP, the first time-frequency resource belonging to the at least one preamble corresponding to the first DL BWP indicated by the second indicating unit 1105. Hence, the determining unit 1102 may determine the first DL BWP according to the indication of the second indicating unit 1105 and the first time-frequency resource.

In an implementation, the second indicating unit 1105 may further indicate the second DL BWP and at least one time-frequency resource used for preamble transmission and corresponding to the second DL BWP; the receiving unit 1101 may further receive a second preamble transmitted by the second UE at a second time-frequency resource, the second time-frequency resource belonging to the at least one time-frequency resource used for preamble transmission and corresponding to the second DL BWP indicated by the second indicating unit 1105; the determining unit 1102 may further determine that it is the second DL BWP that transmits the second message (msg.2B) according to the indication of the second indicating unit 1105 and the second time-frequency resource; and the transmitting unit 1103 may further transmit msg.2B on the second DL BWP.

In an implementation, the second indicating unit 1105 may perform the above indication via broadcast information, or system information and/or RRC signaling.

In an embodiment, as shown in FIG. 11, the random access apparatus 1100 may further include a triggering unit 1106 configured to trigger a UE within a coverage range to initiate contention-based random access, alternatively, indicate the UE of a DL BWP used for transmitting msg.2, and alternatively, designate or not designate a set of preambles and/or a set of time-frequency resources corresponding to a DL BWP and that may be used by the UE in transmitting msg.1.

In an embodiment, as shown in FIG. 11, the random access apparatus 1100 may further include a third indicating unit 1107 configured to indicate the first DL BWP and at least one preamble corresponding to the first DL BWP, the first preamble belonging to the at least one preamble corresponding to the first DL BWP indicated by the third indicating unit; and the determining unit 1102, according to the indication of the third indicating unit 1107 and the first preamble, determines that it is the first DL BWP that transmits msg.2A.

In an embodiment, as shown in FIG. 11, the random access apparatus 1100 may further include a fourth indicating unit 1108 configured to indicate the first DL BWP and at least one time-frequency resource used for preamble transmission and corresponding to the first DL BWP, the first time-frequency resource belonging to the at least one time-frequency resource used for preamble transmission corresponding to the first DL BWP and indicated by the fourth indicating unit 1108; and the determining unit 1102 determines that it is the first DL BWP that transmits msg.2A according to the indication of the fourth indicating unit 1108 and the first time-frequency resource.

In an embodiment, the receiving unit 1101 may further receive a third message (msg.3A) transmitted by the first UE. An identification of the first UE may be contained in msg.3A. Hence, the transmitting unit 1103 may transmit a fourth message (msg.4A) to the first UE according to the identification of the first UE.

In an embodiment, the transmitting unit 1103 may transmit msg.4A via a DL BWP transmitting msg.2A, or transmit msg.4A via an activated DL BWP before the first UE initiates contention-based random access, or transmit msg.4A via a default DL BWP configured for the first UE, or transmit msg.4A via an activated DL BWP when the activated DL BWP does not expire before the first UE initiates contention-based random access, or transmit msg.4A via a default DL BWP configured for the first UE when an activated DL BWP expires before the first UE initiates contention-based random access.

In another implementation of an embodiment, msg.1 received by the receiving unit 1101 contains indication information indicating DL BWPs transmitting msg.2, and the determining unit 1102 may determine the DL BWPs transmitting msg.2 according to the indication information. The implementation may be used in combination with the above-described implementations.

With the apparatus of the embodiment, the network device may determine the DL BWPs transmitting msg.2 according to the time-frequency resources and/or preambles used by the received msg.1 and/or the indication information carried by msg.1, so as to transmit msg.2, thereby ensuring normal access of the UE.

Embodiment 4

The embodiment provides a random access apparatus, configured in a UE. As principles of the apparatus for solving problems are similar to that of the method in Embodiment 2, the implementation of the method in Embodiment 2 may be referred to for implementation of the apparatus, with identical contents being not going to be described herein any further.

Figure 12:
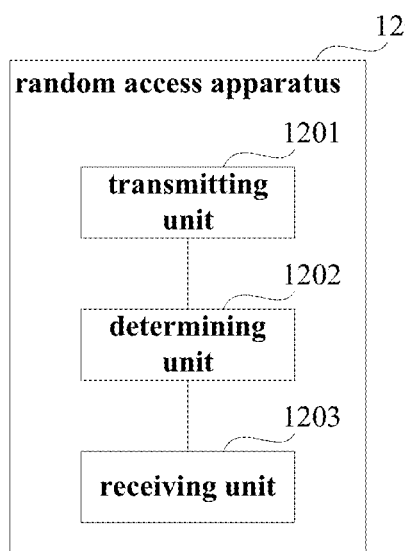
FIG. 12 is a schematic diagram of the random access apparatus of Embodiment 4.

FIG. 12 is a schematic diagram of the apparatus. As shown in FIG. 12, a random access apparatus 1200 includes a determining unit 1201, a transmitting unit 1202 and a receiving unit 1203. The determining unit 1201 determines a DL BWP receiving msg.2; the transmitting unit 1202 selects a first time-frequency resource from at least one time-frequency resource used for preamble transmission and corresponding to the DL BWP, selects a first preamble from at least one preamble corresponding to the DL BWP, and transmits the first preamble on the selected first time-frequency resource; and the receiving unit 1203 monitors and receives msg.2 on the DL BWP.

In one implementation of an embodiment, the receiving unit 1203 may further receive a first DL BWP indicated by a network device and at least one time-frequency resource used for preamble transmission and corresponding to the first DL BWP, and/or receive a second DL BWP indicated by the network device and at least one time-frequency resource used for preamble transmission and corresponding to the second DL BWP. And the determining unit 1201 may determine the DL BWP receiving msg.2 according to the first time-frequency resource transmitting the first preamble, the first DL BWP indicated by the network device and the at least one time-frequency resource used for preamble transmission and corresponding to the first DL BWP, and/or the second DL BWP indicated by the network device and the at least one time-frequency resource used for preamble transmission and corresponding to the second DL BWP.

In another implementation of an embodiment, the receiving unit 1203 may further receive the first DL BWP indicated by the network device and at least one preamble corresponding to the first DL BWP, and/or receive the second DL BWP indicated by the network device and at least one preamble corresponding to the second DL BWP. And the determining unit 1201 may determine the DL BWP receiving msg.2 according to the first preamble, the first DL BWP indicated by the network device and the at least one preamble corresponding to the first DL BWP, and/or the second DL BWP indicated by the network device and the at least one preamble corresponding to the second DL BWP.

In a further implementation of an embodiment, the determining unit 1201 may determine the DL BWP receiving msg.2 according to a DL BWP used for transmitting msg.2 and indicated by the network device in triggering the UE to perform contention-based random access.

In one implementation of an embodiment, in a case where the network device does not designate a set of preambles and/or a set of resources corresponding to a DL BWP and used in transmitting msg.1, the transmitting unit 1202 may transmit msg.1 in following manners.

In a case where a current active UL BWP contains the PRACH resources used for transmitting msg.1, selecting a PRACH resource and a preamble used for transmitting msg.1 from the current active UL BWP to transmit msg.1, or switching to another allocated and unactivated UL BWP containing PRACH resources used for transmitting msg.1 and selecting a PRACH resource and preamble for transmitting msg.1 therefrom to transmit msg.1; or switching to UL BWP containing PRACH resources used for transmitting msg.1 than all allocated UL BWPs and selecting a PRACH resource and preamble for transmitting msg.1 therefrom to transmit msg.1; or in a case where the number of activated UL BWPs does not reach a maximum value, activating other allocated unactivated UL BWPs containing PRACH resources used for transmitting msg.1 and selecting therefrom a PRACH resource and preamble used for transmitting msg.1 to transmit msg.1; or in a case where the number of activated UL BWPs does not reach a maximum value, activating other UL BWPs containing PRACH resources used for transmitting msg.1 than all allocated UL BWPs and selecting therefrom a PRACH resource and preamble used for transmitting msg.1 to transmit msg.1; or switching at least one activated UL BWP to other allocated unactivated UL BWPs containing PRACH resources used for transmitting msg.1 and selecting therefrom a PRACH resource and preamble used for transmitting msg.1 to transmit msg.1; or switching at least one activated UL BWP to other UL BWPs containing PRACH resources used for transmitting msg.1 than all allocated UL BWPs and selecting therefrom a PRACH resource and preamble used for transmitting msg.1 to transmit msg.1.

In another implementation of an embodiment, in a case where the network device designates a set of preambles and/or a set of time-frequency resources corresponding to a DL BWP and used in transmitting msg.1, the transmitting unit 1202 may select a time-frequency resource and preamble used for transmitting msg.1 from the set of preambles and/or the set of time-frequency resources used for transmitting msg.1 and designated by the network device to transmit msg.1.

In another implementation of an embodiment, msg.1 transmitted by the transmitting unit 1202 carries indication information indicating DL BWPs transmitting msg.2. The implementation may be used in combination with the above-described implementations.

In an embodiment, if CORESET configuration used for transmitting msg.2 on the determined DL BWP is identical to CORESET configuration used for transmitting msg.2 on current active DL BWPs, the receiving unit 1203 may monitor and receive msg.2 on the current active DL BWPs.

In an embodiment, the receiving unit 1203 may also switch to the determined DL BWP, and monitor and receive msg.2 on the determined DL BWPs;

In an embodiment, if the activated DL BWPs do not reach a maximum number, the receiving unit 1203 may also activate the determined DL BWPs, and monitor and receive msg.2 on the determined DL BWPs;

In an embodiment, the receiving unit 1203 may further switch one of the activated DL BWPs to the determined DL BWPs, and monitor and receive msg.2 on the determined DL BWPs.

With the apparatus of the embodiment, the UE may transmit msg.1 to the network device, determine the DL BWPs used by the network device for transmitting msg.2 according to transmitted msg.1 (such as the time-frequency resource and/or preamble transmitting msg.1 and/or the indication information carried by msg.1), and monitor and receive msg.2 on the DL BWPs, thereby completing the whole procedure of random access. Hence, normal access of the UE is ensured.

Embodiment 5

The embodiment provides a network device, such as a gNB (a base station of NR), including the random access apparatus as described in Embodiment 3.

Figure 13:
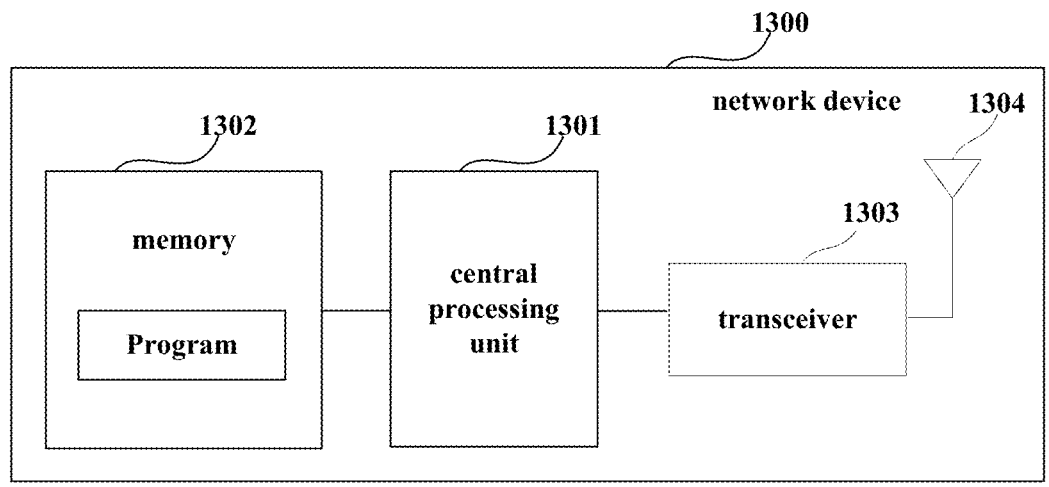
FIG. 13 is a schematic diagram of the network device of Embodiment 5.

FIG. 13 is a schematic diagram of the network device of the embodiment. As shown in FIG. 13, the network device 1300 may include a central processing unit 1301 and a memory 1302, the memory 1302 being coupled to the central processing unit 1301. The memory 1302 may store various data, and furthermore, it may store a program for information processing, and execute the program under control of the central processing unit 1301, so as to receive various information transmitted by the UE, and transmit various information to the UE.

In one implementation, the functions of the random access apparatus as described in Embodiment 3 may be integrated into the central processing unit 1301, and may be carried out by the central processing unit 1301. The functions of the random access apparatus are incorporated herein, and shall not be described herein any further.

In another implementation, the random access apparatus as described in Embodiment 3 and the central processing unit 1301 may be configured separately. For example, the random access apparatus may be configured as a chip connected to the central processing unit 1301, with its functions being realized under control of the central processing unit 1301.

Furthermore, as shown in FIG. 13, the network device 1300 may include a transceiver 1303, and an antenna 1304, etc. Functions of the above components are similar to those in the related art, and shall not be described herein any further. It should be noted that the network device 1300 does not necessarily include all the parts shown in FIG. 13, and furthermore, the network device 1300 may include parts not shown in FIG. 13, and the related art may be referred to.

With the network device of the embodiment, the DL BWPs transmitting msg.2 may be determined according to the preambles and/or time-frequency resources used by the received msg.1 and/or the indication information carried by msg.1, so as to transmit msg.2, thereby ensuring normal access of the UE.

Embodiment 6

The embodiment provides a UE, including the random access apparatus as described in Embodiment 4.

Figure 14:
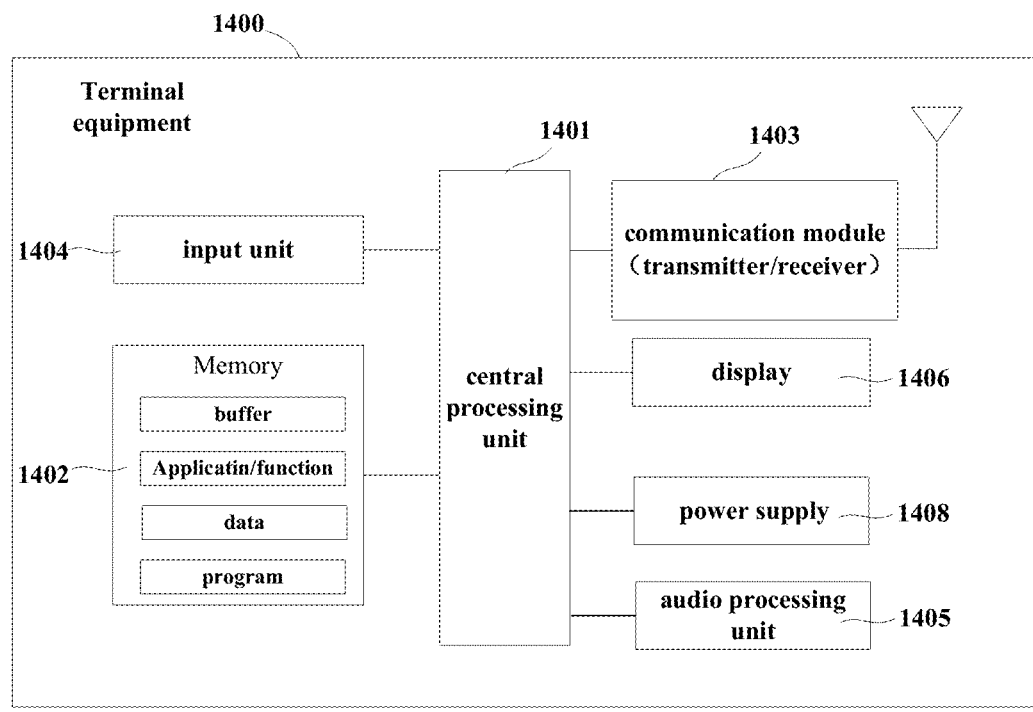
FIG. 14 is a schematic diagram of the UE of Embodiment 6.

FIG. 14 is a schematic diagram of a structure of a UE 1400 of the embodiment. As shown in FIG. 14, the UE 1400 may include a central processing unit 1401 and a memory 1402, the memory 1402 being coupled to the central processing unit 1401. It should be noted that this figure is illustrative only, and other types of structures may also be used, so as to supplement or replace this structure and achieve a telecommunications function or other functions.

In one implementation, the functions of the random access apparatus as described in Embodiment 4 may be integrated into the central processing unit 1401, and may be carried out by the central processing unit 1401. The functions of the random access apparatus are incorporated herein, and shall not be described herein any further.

In another implementation, the random access apparatus as described in Embodiment 4 and the central processing unit 1401 may be configured separately. For example, the random access apparatus may be configured as a chip connected to the central processing unit 1401, with its functions being realized under control of the central processing unit 1401.

As shown in FIG. 14, the UE 1400 may further include a communication module 1403, an input unit 1404, an audio processing unit 1404, a display 1406, and a power supply 1407. It should be noted that the UE 1400 does not necessarily include all the parts shown in FIG. 14, and furthermore, the UE 1400 may include parts not shown in FIG. 14, and the related art may be referred to.

As shown in FIG. 14, the central processing unit 1401 is sometimes referred to as a controller or control, which may include a microprocessor or other processing devices and/or logic devices, and the central processing unit 1401 receives input and controls operations of every component of the UE 1400.

The memory 1402 may be, for example, one or more of a buffer memory, a flash memory, a hard drive, a mobile medium, a volatile memory, a nonvolatile memory, or other suitable devices, which may store various information, and furthermore, store programs executing related information. And the central processing unit 1401 may execute programs stored in the memory 1402, so as to realize information storage or processing, etc. Functions of other parts are similar to those of the related art, which shall not be described herein any further. The parts of the UE 1400 may be realized by specific hardware, firmware, software, or any combination thereof, without departing from the scope of the present disclosure.

With the UE of the embodiment, msg.1 may be transmitted to the network device, the DL BWPs used by the network device for receiving msg.2 may be determined according to transmitted msg.1 (such as the time-frequency resource and/or preamble transmitting msg.1 and/or the indication information carried by mmsg.1), and msg.2 is monitored and received on the DL BWPs, thereby completing the whole procedure of random access. Hence, normal access of the UE is ensured.

Embodiment 7

The embodiment provides a communication system, including a network device and a UE, the network device being, for example, the network device 1300 as described in Embodiment 5, and the UE being, for example, the UE 1400 as described in Embodiment 6.

In an embodiment, the network device may be, for example, a gNB in NR, and include, in addition to the random access apparatus as described in Embodiment 3, conventional components and functions of a network device, which are as described in Embodiment 5, and shall not be described herein any further.

In an embodiment, the UE may be, for example, a UE served by a gNB in NR, and include, in addition to the random access apparatus as described in Embodiment 4, conventional components and functions of a UE, which are as described in Embodiment 6, and shall not be described herein any further.

With the communication system of the embodiment, normal access of the UE may be ensured.

An embodiment of the present disclosure provides a computer readable program, which, when executed in a network device, will cause a computer to carry out the method as described in Embodiment 1 in the network device.

An embodiment of the present disclosure provides a computer storage medium, including a computer readable program, which will cause a computer to carry out the method as described in Embodiment 1 in a network device.

An embodiment of the present disclosure provides a computer readable program, which, when executed in a UE, will cause a computer to carry out the method as described in Embodiment 2 in the UE.

An embodiment of the present disclosure provides a computer storage medium, including a computer readable program, which will cause a computer to carry out the method as described in Embodiment 2 in a UE.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 11 (such as the receiving unit, the determining unit, and the transmitting unit, etc.) may either correspond to software modules of procedures of a computer program, or correspond to hardware modules. Such software modules may respectively correspond to the blocks shown in FIG. 3. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure. For implementations of the present disclosure containing the above embodiments, following supplements are further disclosed.

Supplement 1. A random access method, applicable to a network device, the method including:

receiving, by a network device, a first message (msg.1) transmitted by a UE, the msg.1 containing indication information indicating downlink bandwidth part (DL BWP) transmitting a second message (msg.2), the indication information being bit information;

determining, by the network device according to the indication information, the DL BWP transmitting the msg.2; and transmitting, by the network device, the msg.2 on the determined DL BWPs.

Supplement 2. The method according to supplement 1, wherein the network device, according to the indication information and a time-frequency resource transmitting the msg.1 and/or a preamble used by the msg.1, further determines the DL BWP transmitting the msg.2.

Supplement 3. The method according to supplement 2, wherein the method further includes:

indicating, by the network device, preambles corresponding to DL BWPs; and determining, by the network device, the DL BWP transmitting the msg.2 according to the indication information, a preamble used by the received msg.1 and the indicated preambles corresponding to the DL BWPs.

Supplement 4. The method according to supplement 2 or 3, wherein the method further includes:

indicating, by the network device, time-frequency resources used for transmitting msg.1 and corresponding to DL BWPs;

determining, by the network device, DL BWP transmitting the msg.2, according to the indication information, a time-frequency resource receiving the msg.1 and the indicated time-frequency resources used for transmitting msg.1 and corresponding to the DL BWPs.

Supplement 5. A random access method, applicable to a UE, the method including:

transmitting, by the UE, msg.1 to a network device, the msg.1 containing indication information indicating the network device of carrier bandwidth (DL BWP) transmitting a second message (msg.2), the indication information being bit information;

determining, by the UE, according to the indication information, a DL BWP receiving the msg.2; and receiving, by the UE, on the determined DL BWP, the msg.2 transmitted by the network device.

Supplement 6. The method according to supplement 5, wherein the UE further determines the DL BWP receiving the msg.2 according to the indication information, the time-frequency resource transmitting the msg.1 and/or a preamble used by the msg.1.

Supplement 7. The method according to supplement 6, wherein, the UE determines the DL BWP receiving the msg.2 according to the indication information, preambles to which the DL BWPs correspond indicated by the network device and the preamble used by the msg.1.

Supplement 8. The method according to supplement 6 or 7, wherein, the UE determines the DL BWP receiving the msg.2 according to the indication information, the time-frequency resource transmitting the msg.1 and the time-frequency resources used for transmitting the msg.1 corresponding to the DL BWPs and indicated by the network device.

What is claimed is:

1. A network apparatus comprising:
a processor configured to configure at least two uplink bandwidth parts (UL BWPs), wherein each UL BWP is configured with at least one time-frequency resource for a User Equipment (UE) to transmit a preamble, and configure at least two downlink bandwidth parts (DL BWPs) for the UE to receive a random access response (RAR) after transmitting a preamble,
wherein the at least two UL BWPs for the UE to transmit a preamble and the at least two DL BWPs for the UE to receive a RAR after transmitting a preamble are of one-to-one correspondence based on value of BWP index, and a DL BWP in the at least two DL BWPs corresponds to a UL BWP which is configured with same value of BWP index as the DL BWP;
a receiver configured to receive a preamble transmitted by the UE at a first time-frequency resource in an UL BWP in the at least two UL BWPs;
a controller configured to, according to the received preamble, determine a DL BWP of the at least two DL BWPs, the DL BWP corresponding to the UL BWP in which the preamble is received; and
a transmitter configured to transmit a RAR corresponding to the received preamble on the determined DL BWP.

2. The network apparatus according to claim 1, wherein the transmitter is further configured to transmit a first information, the first information including an indication of a first DL BWP, and a second information indicating at least one time-frequency resource allocated for transmitting the preamble by the UE corresponding to the first DL BWP.

3. The network apparatus according to claim 2, wherein the transmitter transmits the first information and the second information via at least one of: broadcast information, system information and RRC signaling.

4. The network apparatus according to claim 2, wherein the at least one time-frequency resource for transmitting the preamble by the UE corresponding to the first DL BWP is located in a first uplink (UL) BWP.

5. The network apparatus according to claim 2, wherein the at least one time-frequency resource for transmitting the preamble by the UE corresponding to the first DL BWP is a first UL BWP containing Physical Random Access Channel (PRACH) resources.

6. The network apparatus according to claim 3, wherein the second information includes information of a first UL BWP containing PRACH resources, wherein the UL BWP containing PRACH resources corresponds with a first DL BWP.

7. The network apparatus according to claim 1, wherein the at least two UL BWPs and the at least two DL BWPs are of one-to-one correspondence based on value of BWP index for the UE performing a random access procedure.

8. A terminal comprising:
a processor circuit configured to:
configure at least two uplink bandwidth parts (UL BWPs), wherein each UL BWP is configured with at least one time-frequency resource to transmit a preamble, and
configure at least two downlink bandwidth parts (DL BWPs) for a User Equipment (UE) to receive a random access response (RAR) after transmitting a preamble, wherein the at least two UL BWPs for the UE to transmit a preamble and the at least two DL BWPs for the UE to receive a RAR after transmitting a preamble are of one-to-one correspondence based on value of BWP index, and a DL BWP in the at least two DL BWPs corresponds to a UL BWP which is configured with same value of BWP index as the DL BWP;
determine an active DL BWP of the at least two DL BWPs, the active DL BWP having a corresponding UL BWP of the at least two UL BWPs;
select a time-frequency resource in the corresponding UL BWP of the at least two UL BWPs from at least one time-frequency resource allocated for preamble transmission corresponding to the active DL BWP; and
select a first preamble from at least one preamble allocated for preamble transmission corresponding to the active DL BWP;
a transmitter configured to transmit the first preamble, on the selected time-frequency resource, to network device; and
a receiver configured to receive a RAR on the active DL BWP.

9. The terminal according to claim 8, wherein the receiver receives from the network device a first information, the first information including an indication of a first DL BWP, and second information indicating at least one time-frequency for transmitting the preamble corresponding to the first DL BWP.

10. The terminal according to claim 9, wherein the receiver receives the first information and second information via at least one of: broadcast information, system information and RRC signaling from the network device.

11. The terminal according to claim 9, wherein the processor determines that the first DL BWP is the same as the active DL BWP based on the received first information and second information.

12. The terminal according to claim 9, wherein the at least one time-frequency resource used for transmitting the preamble corresponding to the first DL BWP is a time-frequency resource of a first uplink bandwidth part (UL BWP).

13. The terminal according to claim 9, wherein the at least one time-frequency resource used for transmitting the preamble corresponding to the first DL BWP is a first UL BWP containing PRACH resources.

14. The terminal according to claim 12, wherein the second information corresponds to information of the first UL BWP containing PRACH, wherein the first UL BWP containing PRACH resources corresponds to the first DL BWP.

15. The terminal according to claim 8, wherein, the receiver switches to a first DL BWP, and monitors and receives the RAR in the first DL BWP.

16. The terminal according to claim 8, wherein before the transmitter transmits the preamble on the time-frequency resource, the transmitter is further configured to switch to a first UL BWP containing PRACH resources, wherein the time-frequency resource is a time-frequency resource for the first UL BWP.

17. The terminal according to claim 8, wherein the RAR is a message 2 of random access procedure.

18. A communication system, comprising;
a User Equipment (UE) configured to:
configure at least two uplink bandwidth parts (UL BWPs), wherein each UL BWP is configured with at least one time-frequency resource to transmit a preamble, and
configure at least two downlink bandwidth parts (DL BWPs) for the UE to receive a random access response (RAR) after transmitting a preamble, wherein the at least two UL BWPs for the UE to transmit a preamble and the at least two DL BWPs for the UE to receive a RAR after transmitting a preamble are of one-to-one correspondence based on value of BWP index, and a DL BWP in the at least two DL BWPs corresponds to a UL BWP which is configured with same value of BWP index as the DL BWP;
determine an active DL BWP of the at least two DL BWPs to receive a RAR, the active DL BWP corresponding to the UL BWP of the at least two UL BWPs;
select a time-frequency resource in the corresponding UL BWP of the at least two UL BWPs from at least one time-frequency resource allocated for preamble transmission corresponding to the determined DL BWP;
select a preamble from at least one preamble allocated for preamble transmission according to the determined DL BWP; and
transmit the preamble, on the selected time-frequency resource, to a network device; and
the network device configured to:
configure at least two UL BWPs, wherein each UL BWP is configured with at least one time-frequency resource for the UE to transmit a preamble, and
configure at least two DL BWPs for the UE to receive a RAR after transmitting a preamble, wherein the at least two UL BWPs for the UE to transmit a preamble and the at least two DL BWPs for the UE to receive a RAR after transmitting a preamble are of one-to-one correspondence based on value of BWP index, and a DL BWP in the at least two DL BWPs corresponds to a UL BWP which is configured with same value of BWP index as the DL BWP;
receive the preamble transmitted by the UE;
determine, according to the received preamble, the DL BWP in the at least two DL BWPs according to the UL BWP in which the preamble is received, the DL BWP is corresponding to the UL BWP of the at least two UL BWPs; and
transmit a RAR corresponding to the received preamble on the determined DL BWP, wherein the UE is further configured to receive the RAR on the DL BWP.

19. The communication system according to claim 18, wherein when the UE determines the DL BWP to receive a RAR, the UE is further configured to:
determine whether an uplink bandwidth part (UL BWP) corresponds to the DL BWP, and when the UL BWP does not correspond with the DL BWP, switch the DL BWP to a first DL BWP corresponding to the UL BWP.

20. The communication system according to claim 19, wherein when the UE switches the DL BWP to a first DL BWP, the UE is configured to:
select a time-frequency resource from at least one time-frequency resource allocated for preamble transmission corresponding to the first DL BWP;
select a first preamble from at least one preamble allocated for preamble transmission corresponding to the first DL BWP; and
transmit the first preamble, on the selected time-frequency resource.

* * * * *